(12) United States Patent
Monk et al.

(10) Patent No.: US 10,535,116 B2
(45) Date of Patent: Jan. 14, 2020

(54) SHARED VIRTUAL REALITY

(71) Applicant: GOOGLE LLC, Mountain View, CA (US)

(72) Inventors: Jason Monk, Salem, MA (US); Geoffrey Allen Borggaard, Lincoln, MA (US); Richard Daniel Borovoy, Boston, MA (US)

(73) Assignee: GOOGLE LLC, Mountain View, CA (US)

( * ) Notice: Subject to any disclaimer, the term of this patent is extended or adjusted under 35 U.S.C. 154(b) by 2 days.

(21) Appl. No.: 15/823,456

(22) Filed: Nov. 27, 2017

(65) Prior Publication Data

US 2018/0096450 A1 Apr. 5, 2018

Related U.S. Application Data

(63) Continuation of application No. 14/225,034, filed on Mar. 25, 2014, now Pat. No. 9,830,679.

(51) Int. Cl.
| | |
|---|---|
| *G06T 19/00* | (2011.01) |
| *G06T 3/00* | (2006.01) |
| *A63F 13/65* | (2014.01) |
| *A63F 13/216* | (2014.01) |
| *A63F 13/213* | (2014.01) |
| *A63F 13/33* | (2014.01) |

(52) U.S. Cl.
CPC .......... *G06T 3/0031* (2013.01); *A63F 13/213* (2014.09); *A63F 13/216* (2014.09); *A63F 13/33* (2014.09); *A63F 13/65* (2014.09); *G06T 19/006* (2013.01)

(58) Field of Classification Search
CPC ........................... G06T 19/006; G63F 13/216
See application file for complete search history.

(56) References Cited

U.S. PATENT DOCUMENTS

| | | | |
|---|---|---|---|
| 9,830,679 B2 | 11/2017 | Monk et al. | |
| 2007/0173265 A1 | 7/2007 | Gum | |
| 2011/0216002 A1 | 9/2011 | Weising et al. | |
| 2011/0219084 A1 | 9/2011 | Borra et al. | |
| 2011/0298824 A1 | 12/2011 | Lee et al. | |
| 2012/0244945 A1* | 9/2012 | Kolo | A63F 13/61 463/42 |
| 2013/0073619 A1 | 3/2013 | Tumuluri | |
| 2013/0141421 A1 | 6/2013 | Mount et al. | |

(Continued)

*Primary Examiner* — Ryan McCulley
(74) *Attorney, Agent, or Firm* — Brake Hughes Bellermann LLP (57) ABSTRACT

An immersive three dimensional (3-D) virtual reality sharing program is disclosed. The system comprises a content controller configured to determine the physical locations of a reference point and boundary in a physical space and map them to a corresponding point and boundary in a virtual world. The physical location and orientation of a user device relative to the reference point and boundary are used to determine a corresponding location and orientation in the 3-D virtual world. A representation of a portion of the 3-D virtual world corresponding to the determined location and orientation is rendered at the user device. As the user device is moved in the physical world, a corresponding updated location in the 3-D virtual world is determined, and the rendered representation updated. Thus, the user device acts as a window into the 3-D virtual world.

19 Claims, 8 Drawing Sheets

(56) References Cited

U.S. PATENT DOCUMENTS

| | | | |
|---|---|---|---|
| 2014/0115502 A1* | 4/2014 | Van Wie | H04W 4/21 715/757 |
| 2014/0132633 A1 | 5/2014 | Fekete et al. | |
| 2014/0240351 A1 | 8/2014 | Scavezze et al. | |
| 2014/0289140 A1* | 9/2014 | Vijayant | H04W 4/21 705/319 |
| 2014/0306866 A1 | 10/2014 | Miller et al. | |
| 2015/0148061 A1 | 5/2015 | Koukoumidis et al. | |
| 2015/0193979 A1 | 7/2015 | Grek | |

* cited by examiner

025# SHARED VIRTUAL REALITY

CROSS REFERENCE TO RELATED APPLICATION

This application is a continuation and claims the benefit of U.S. application Ser. No. 14/225,034, filed Mar. 25, 2014, the disclosure of which is incorporated by reference herein in its entirety.

FIELD OF THE DISCLOSURE

The present invention relates generally to virtual reality and, more specifically, to multiple mobile handheld devices navigating a shared virtual reality.

DESCRIPTION OF THE RELATED ART

The proliferation of computing devices and developments in image processing provide numerous opportunities for a user to experience virtual reality. With virtual reality devices, the user can view a virtual world that can only be imagined or is difficult to experience. For example, the user can view a virtual animated world or movie through a three dimensional (3-D) display device. As another example, the user can observe popular tourists attractions or preview intended destination and surroundings through a virtual tour program.

A conventional virtual reality device allows for the user to visually observe 3-D images through a 3-D display device. However, this may require polarizing glasses that filter a right eye image and a left eye image to fully experience the virtual reality. Additionally, the conventional virtual reality device limits the user's virtual reality experience to contents that are projected through the display device. Another form of conventional virtual reality device allows the user to roam around the virtual world via input from one or more controls operated by the user. However, the input from the user is executed through input devices such as a keyboard, mouse, joystick, or other user commands, where the user's physical movement or location is separated from that in the virtual world. Thus, the user cannot fully immerse into the virtual reality with these conventional virtual reality devices. Another form of conventional virtual reality system enables users to interact with the virtual world via physical movements using external motion capture technology. However, such systems require complicated and expensive external motion analysis equipment and thus limit where the virtual reality can be experienced.

SUMMARY

Embodiments of the present disclosure include a system and method for a content controller to overlay a three dimensional (3-D) virtual world onto a physical space and to share an immersive 3-D virtual reality with user devices. In one embodiment, a method of displaying a three dimensional (3-D) virtual world controlled by a content controller is disclosed. The method comprises identifying, at a user device, a physical location and orientation of the user device within a physical space. In addition, the method comprises receiving, at the user device, mapping information of the 3-D virtual world. The mapping information of the 3-D virtual world comprises a mapping between a reference point in the physical space and a corresponding point in the 3-D virtual world. Moreover, the method comprises updating, at the user device, the physical location and orientation of the user device. The updated physical location and orientation of the user device corresponds to a physical movement of the user device. Furthermore, the method comprises determining, at the user device, a location and orientation in the 3-D virtual world based on the updated physical location and orientation of the user device relative to the reference point in the physical space. Additionally, the method comprises displaying, at the user device, a representation of a portion of the 3-D virtual world corresponding to the determined location and orientation in the 3-D virtual world.

In one embodiment, a method of automatically positioning and scaling, at a content controller, a three dimensional (3-D) virtual world displayed on a plurality of user devices is disclosed. The method comprises identifying physical locations of a reference point and boundary in a physical space by positioning the mapping devices at the reference point and boundary in the physical space. Each of the mapping devices identifies and updates its own physical location and orientation. In addition, the method comprises generating a first mapping between the reference point in the physical space and a corresponding point in the 3-D virtual world. Additionally, the method comprises generating a second mapping between the boundary in the physical space and a corresponding boundary in the 3-D virtual world. Moreover, the method comprises transmitting, to each of the plurality of user devices, mapping information of the 3-D virtual world. The mapping information of the 3-D virtual world comprises the first mapping and the second mapping.

In one embodiment, a three dimensional (3-D) virtual reality sharing system is disclosed. The system comprises a content controller configured to generate mapping information of a 3-D virtual world. The mapping information comprises a mapping between a reference point in a physical space and a corresponding point in the 3-D virtual world. In addition, the system comprises a user device configured to display a representation of the 3-D virtual world. The user device comprises a position detection module configured to identify and update, at the user device, a physical location and orientation of the user device. In addition, the user device comprises a user device network module configured to receive the mapping information. Additionally, the user device comprises a user device 3-D processor module. The user device 3-D processor module is configured to determine, at the user device, a location and orientation in the 3-D virtual world based on the updated physical location and orientation of the user device relative to the reference point in the physical space. In addition, the user device 3-D processor module is configured to generate, at the user device, the representation of the 3-D virtual world corresponding to the location and orientation in the 3-D virtual world. Moreover, the user device comprises a user interface module configured to display the representation of the 3-D virtual world.

The features and advantages described in this summary and the following detailed description are not all-inclusive. Many additional features and advantages will be apparent to one of ordinary skill in the art in view of the drawings, specification, and claims presented herein.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments of various systems, methods, and computer-readable storage media that enable overlaying a three dimensional (3-D) virtual world on a physical space and sharing a 3-D virtual reality with others are described below. The 3-D virtual world is an animated 3-D world created with computer graphics imaging and other rendering software. The 3-D virtual world may be an imaginary place or an environment difficult to experience. The 3-D virtual world may be stationary or non-stationary.

Embodiments include one-way or two-way communication among a content controller, user devices, and a content server. Each user device renders a representation of a portion of 3-D virtual world corresponding to a location and orientation in the 3-D virtual world. The location and orientation in the 3-D virtual world are determined based on a physical location and orientation of a user device in a physical space. As the user device physically moves, the user device updates the representation of the portion of the 3-D virtual world according to a physical movement of the user device. In one embodiment, the content controller automatically positions and scales the 3-D virtual world based on the shape and size in the physical space in which the user devices are located. In another embodiment, the content controller groups the user devices into one or more sections, and provides mapping information of a corresponding 3-D virtual world to each of the user devices. The content server stores maps and related information of 3-D virtual worlds, and provides them to the content controller and/or the user devices.

Immersive 3-D Virtual Reality Sharing System

Figure 1:
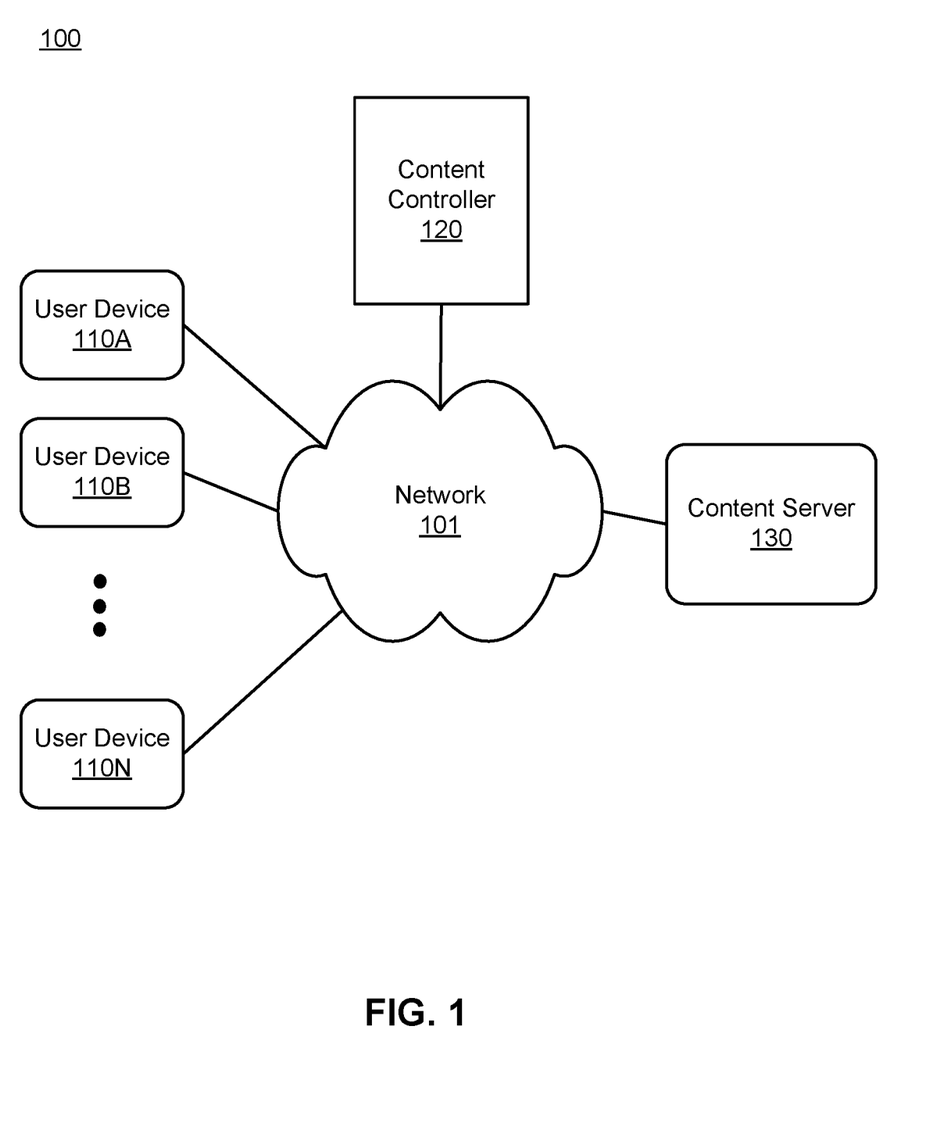
FIG. 1 is a high level block diagram of a three dimensional (3-D) virtual reality sharing system comprising a plurality of user devices, a content controller, and a content server in accordance with an embodiment.

FIG. 1 is an illustration of an immersive three dimensional (3-D) virtual reality sharing system 100 in accordance with one embodiment. The illustrated system 100 includes a plurality of user devices 110A-N (generally referred to as a user device 110), that are coupled to a network 101. In other embodiments, the system 100 contains different and/or additional elements. In addition, the functions may be distributed among the elements in a different manner than described herein.

In various embodiments, the user device 110 may include any mobile handheld device capable of being carried by a user that can display a representation of the 3-D virtual world, such as a personal digital assistant (PDA), a smart phone, a tablet personal computer, and the like. In one specific embodiment, the user device 110 is a smart phone or a tablet personal computer operating on Android® operating system provided by Google Inc. In another specific embodiment, the user device 110 is an iPhone® or iPad® device provided by Apple, Inc. The user device 110 may be programmed with a user-downloadable application providing one or more of the functions described herein.

In various embodiments, the network 101 may include, but is not limited to, a local area network (LAN), a wide area network (WAN), a wireless network, an intranet, or the Internet, for example.

The system 100 also includes a content server 130 that is connected to the network 101 and at least one content controller 120. In one embodiment, the content server 130 stores maps and related information of the 3-D virtual worlds, and the content controller 120 manages access to this information. The related information may include, but is not limited to, indexes, descriptions, messages, interactive contents of the 3-D virtual worlds, and/or metadata. In other embodiments, the content controller 120 itself stores the maps and/or related information of the 3-D virtual worlds.

The user device 110 and/or the content controller 120 receive the maps and related information of the 3-D virtual worlds from the content server 130. Alternatively, the user device 110 receives the maps and related information of the 3-D virtual worlds from the content controller 120. The content controller 120 may grant or control the user device 110 access to the maps and related information of the 3-D virtual worlds, if required. In one embodiment, more than one content server 130 may be employed to store the maps and related information of the 3-D virtual worlds.

Figure 2:
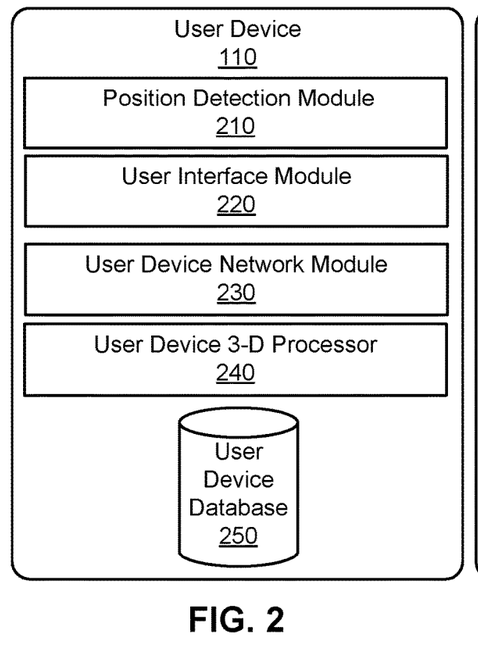
FIG. 2 is a block diagram of a user device suitable for use in the system shown in FIG. 1, in accordance with an embodiment.

FIG. 2 is a block diagram of a user device 110, in accordance with an embodiment. The user device 110 is operated by a user (e.g., an audience member). The illustrated user device 110 includes a position detection module 210, a user interface module 220, a user device network module 230, a user device 3-D processor 240, and a user device database 250. In other embodiments, the user device 110 contains different and/or additional elements. In addition, the functions may be distributed among the elements in a different manner than described herein.

The position detection module 210 of the user device 110 identifies a physical location and orientation of the user device 110. In one embodiment, the physical location is a relative position, relative to other user devices 110, the content controller 120, or a reference point in the physical space. The position detection module 210 at the user device 110 also updates the physical location and orientation of the user device 110. The updated physical location and orientation of the user device 110 provides a measure of a physical movement of the user device 110.

The user interface module 220 allows the user to input information into the user device 110 and displays related information to the user. The related information includes, but is not limited to, indexes, descriptions, messages, alarms, or interactive contents of the 3-D virtual world. For example, when the user device 110 approaches a certain object in the 3-D virtual world or the object in the 3-D virtual world moves towards the user device 110, the user device 110 may display the indexes, descriptions, messages, alarms, or interactive contents related to the object. In one implementation, the interactive contents can be games, quizzes, another 3-D virtual world, or a direction to a certain location in the 3-D virtual world. For example, the user may encounter a planet in a solar system model, and be provided an option or automatically triggered to enter a 3-D virtual world representing the surface of the planet. For another example, when the user approaches the sun within a certain distance, various annotations would show up around the sun. Pressing (or selecting) on these annotations would present more information (e.g., descriptions, videos and etc.) to the user. Additionally, the user may search indexes and input a desired destination into the user interface module 220 in the 3-D virtual world. The user interface module 220 may display directions or a route to arrive at the desired destination in the 3-D virtual world. The user interface module 220 may also display other information relevant to the user, derived from the user device 110 itself, received from the content controller 120, or from other sources.

The user device network module 230 of the user device 110 manages communication among the user device 110, the content controller 120, and the content server 130. Specifically, the user device network module 230 receives instructions or commands from the content controller 120. Under permission from the content controller 120 (if required), the user device network module 230 receives the maps and related information of the 3-D virtual worlds from the content server 130 or the content controller 120. In addition, under permission from the content controller 120 (if required), the user device network module 230 receives mapping information of the 3-D virtual worlds from the content controller 120 or the content server 130 to enable the user device 110 to generate a representation (e.g., an image) of a portion of the 3-D virtual world. In one embodiment, the user device 110 may transmit the physical location and orientation of the user device 110 to the content controller 120, another user device 110, or other external devices. Similarly, the user device 110 may receive a physical location and orientation of another user device 110, the content controller 120, or other external devices.

In addition, the user device 110 communicates with the content controller 120 or another user device 110, and shares responses to the interactive contents. In addition, under permission from the content controller 120 if required, the user device 110 stores, in the user device database 250, user device information such as the maps and related information of the 3-D virtual world, the physical location and orientation of the user device 110, responses to the interactive contents, the mapping information of the 3-D virtual world, and etc, for futures access. In addition, under permission from the content controller 120 if required, the user device 110 may store the user device information in the content server 130 via the user device network module 230 for future access or sharing with other devices. The user device information comprise, but is not limited to, a user profile, activity logs, progress in interactive tasks, preferences, and the like.

The user device 3-D processor 240 of the user device 110 generates a representation of a portion of a 3-D virtual world. The user device 3-D processor 240 receives a physical location and orientation of the user device 110 from the position detection module 210. Additionally, the user device 3-D processor 240 receives mapping information of the 3-D virtual world from the content controller 120 through the user device network module 230 or from the user device database 250. The mapping information of the 3-D virtual world comprises a mapping between a reference point in the physical space and a corresponding point in the 3-D virtual world. Based on the physical location and orientation of the user device 110 relative to the reference point in the physical space, the user device 3-D processor 240 determines a location and orientation in the 3-D virtual world. Furthermore, the user device 3-D processor 240 generates a representation of the portion of the 3-D virtual world that corresponds to the determined location and orientation in the 3-D virtual world. The user interface module 220 displays the representation of the portion of the 3-D virtual world to the user. For example, if a user is stood against the wall in a room pointing a user device 110 towards the center of the room, the user device 110 may display the center of the virtual world as viewed by a camera located at an edge of the virtual world that the mapping data indicates corresponds to the wall.

The position detection module 210 identifies and updates the physical location and orientation of the user device 110, corresponding to the physical movement of the user device 110. The updated position may be determined using position sensors, dead-reckoning methods based on movement of the user device 110, or a combination of both methods. In one embodiment, the position sensor may utilize audible (i.e., low frequency) or non-audible (i.e., high frequency) wireless signal to calculate position. The user device 3-D processor 240 updates the representation of the portion of the 3-D virtual world according to a change in the physical location and orientation of the user device 110. In one embodiment, the user device 3-D processor 240 also updates the representation of the portion of the 3-D virtual world if there is a change in the mapping information of the 3-D virtual world.

Thus, using physical movements of the user device 110, the user can control what portion of the 3-D virtual world is displayed on the user device 110. For example, as the user physically moves around with the user device 110, the viewpoint in the 3-D virtual world displayed exactly mimic the physical movement of the user device 110. Hence, the user device 110 functions as a window into the 3-D virtual world providing an immersive 3-D virtual reality experience.

Figure 3:
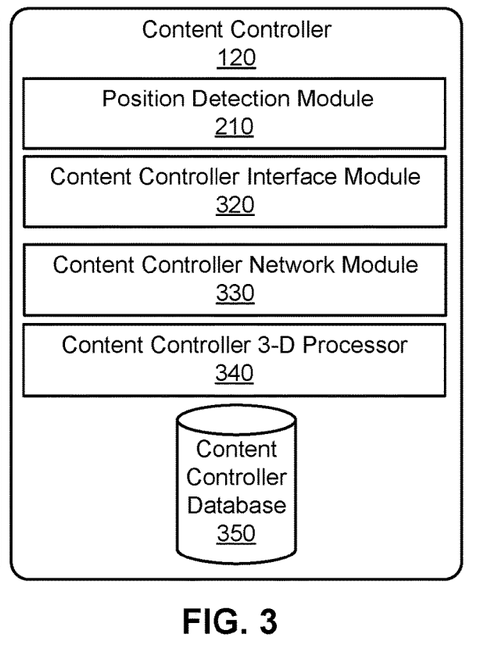
FIG. 3 is a block diagram of the content controller shown in FIG. 1, in accordance with an embodiment.

FIG. 3 is a block diagram of a content controller 120, in accordance with an embodiment of the disclosed system. The content controller 120 is used by a content manager of the shared 3-D virtual world (or an instructor such as a classroom teacher) when the system 100 is in operation. The illustrated content controller 120 includes a position detection module 210, a content controller interface module 320, a content controller network module 330, a content controller 3-D processor 340, and a content controller database 350. In other embodiments, the content controller 120 contains different and/or additional elements. In addition, the functions may be distributed among the elements in a different manner than described herein The content controller 120 is similar to the user device 110. Hence, the position detection module 210, the content controller network module 330, the content controller 3-D processor 340, and the content controller database 350 may be similar to the position detection module 210, the user device network module 230, the user device 3-D processor 240, and the user device database 250 in the user device 110, respectively.

In various embodiments, one difference between the content controller 120 and the user devices 110 is the inclusion of a content controller interface module 320. The content controller interface module 320 enables the content controller 120 to control access of the user devices 110 to resources. For example, the content controller 120 may limit access of the user device 110 to the maps and related information of the 3-D virtual worlds, via the content controller interface module 320. Additionally, the content controller interface module 320 enables the content controller 120 to change or update the mapping information of the 3-D virtual worlds, via the content controller interface module 320. For example, the content controller 120 may shift a corresponding point in a 3-D virtual world to another location in the physical space via the content controller interface module 320. Also, the content controller 120 may scale a boundary of the 3-D virtual world via the content controller interface module 320. The content controller interface module 320 allows the content controller 120 to automatically or manually scale the 3-D virtual world. Moreover, the content controller interface module 320 enables the content controller 120 to monitor and control communication among the plurality of user devices 110A-N, the content controller 120, and the content server 130. In one embodiment, the content controller 120 and the user device 110 can be implemented in a same or similar system. The user device 110 may employ the content controller interface module 320 and operate as the content controller 120, if needed.

In one embodiment, the content controller 120 groups the plurality of user devices 110A-N into one or more sections. The content controller 120 associates each of one or more 3-D virtual worlds with a corresponding section from the one or more sections. Each of the plurality of user devices 110A-N receives mapping information of a corresponding 3-D virtual world from the one or more 3-D virtual worlds. The corresponding 3-D virtual world is associated with a section from the one or more sections, where a user device 110 from the plurality of user devices 110A-N is grouped in the section. Additionally, each of the plurality of user devices 110A-N receives maps and related information of the corresponding 3-D virtual world from the content controller 120 or the content server 130.

In one embodiment, the content controller network module 330 receives physical locations and orientations of the plurality of user devices 110A-N. The content controller interface module 320 may display the physical locations and orientations of the plurality of user devices 110A-N. This helps the content controller 120 to control access and communication of the plurality of user devices 110A-N, and to group the plurality of user devices 110A-N into a plurality of sections depending on the physical locations and orientations of the plurality of user devices 110A-N. The content controller 120 may monitor an updated physical location of each of the user devices 110A-N and rearrange the sections at any time. Alternatively, the content controller 120 may group the plurality of user devices 110A-N by user profile features such as age, progress in interactive tasks, or preferences. One of skill in the art will recognize numerous approaches that may be used to divide the user devices 110A-N into groups.

In one embodiment, the content controller 120 may establish a virtual border between sections in the physical space via the content controller interface module 320 such that the content controller 120 or the user device 110 will be notified when the user device 110 crosses the virtual border. The virtual border may be any arbitrary boundary determined by the content controller 120. Also, the virtual border may be defined as being a certain distance away from the reference point of a 3-D virtual world associated with one of the sections, or a certain distance away from the reference point of another 3-D virtual world associated with a different section. Additionally, the virtual border may be a certain distance away from the physical location corresponding to a border of the 3-D virtual world associated with the section, or a certain distance away from the physical location corresponding to the border of said another 3-D virtual world. The content controller 120 may allow the user device 110 to automatically change its section, when the user device 110 crosses the virtual border.

Figure 4:
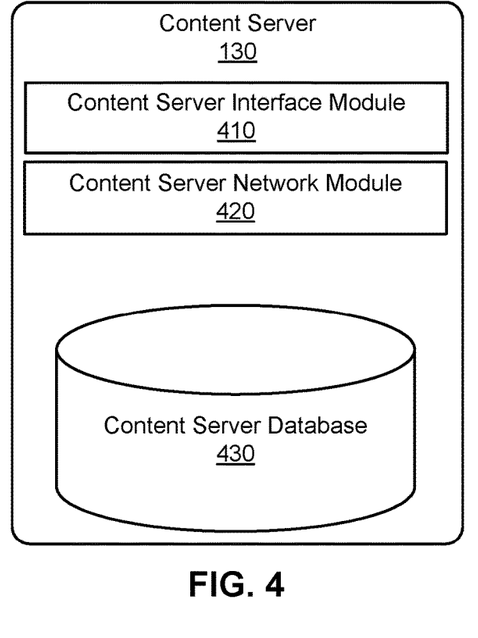
FIG. 4 is a block diagram of the content server shown in FIG. 1, in accordance with an embodiment of the invention.

FIG. 4 is a block diagram of a content server 130, in accordance with an embodiment of the disclosed system 100. The content server 130 is controlled by the content controller 120 or a third party content manager (not shown). The illustrated content server 130 includes a content server interface module 410, a content server network module 420, and a content server database 430. In other embodiments, the content server 130 contains different and/or additional elements. In addition, the functions may be distributed among the elements in a different manner than described herein The content server interface module 410 allows the content controller 120 or the third party content manager to manage contents stored in the content server database 430. The content controller 120 or the third party content manager stores maps and related information of the 3-D virtual worlds in the content server database 430 via the content server network module 420 or the content server interface module 410. The content controller 120 may store mapping information of the 3-D virtual worlds as well. The stored contents may be accessed and copied or downloaded by the content controller 120 or the user device 110 with permission from the content controller 120. The content server 130 may be geographically located far from the user device 110 and the content controller 120.

Figure 5:
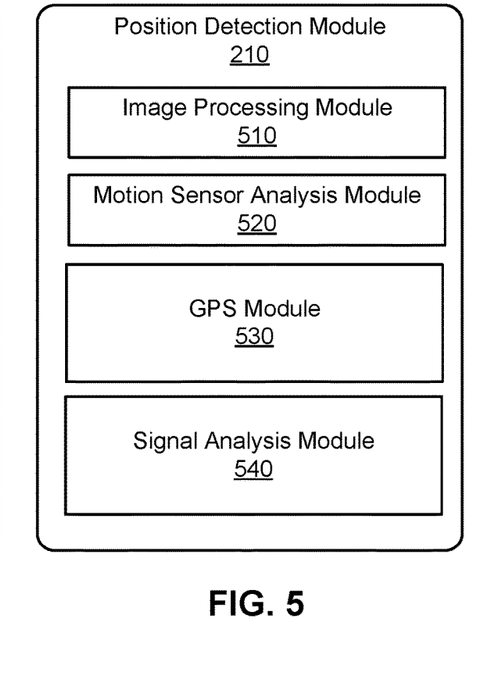
FIG. 5 is a block diagram of a position detection module in a user device or content controller shown in FIG. 1, in accordance with an embodiment.

FIG. 5 is a block diagram illustrating in detail the position detection module 210 of a user device 110 or content controller 120, in accordance with an embodiment. The illustrated position detection module 210 includes an image processing module 510, a motion sensor analysis module 520, a GPS module 530, and a signal analysis module 540. In other embodiments, the position detection module 210 contains different and/or additional elements. In addition, some elements may be omitted and/or the functions may be distributed among the elements in a different manner than described herein The image processing module 510 identifies a physical location and orientation of the user device 110 or the content controller 120 without any external device. The image processing module 510 captures an image of a predetermined picture at a fixed location in a physical space with a camera internally or externally attached to the user device 110. The predetermined picture may be a QR coded picture. The image processing module 510 further performs image processing from the user device 110 to determine a relative location and orientation of the user device 110 from the predetermined picture at the fixed location. Based on the relative location and orientation, the image processing module 510 determines the physical location and orientation of the user device 110 based on the captured image of the predetermined picture. For example, the user device 110 captures an image of a QR coded picture attached to a wall at a fixed location, and the image processing module 510 determines that the user device 110 is two meters away from the fixed location at a horizontal angle of 15 degrees from perpendicular to the wall.

The GPS module 530 receives GPS satellite system signals and determines a physical location of the user device 110. Suitable GPS receivers are commonly found in handheld mobile devices such as cell phones, tablet computers, and other electronics. Similarly, the signal analysis module 540 receives any form of wireless signals from beacons placed in known positions around the physical space. In one implementation, the wireless signals are Bluetooth signals or cellular signals from the beacons. The signal analysis module 540 analyzes the received signal strength from the beacons to triangulate the position of the user device 110. Although not necessary, external devices such as the beacons may be used to initially help determine or to periodically update the physical location of the user device 110. Additionally, each user device 110 may produce and transmit audible chirps without the beacons, and time to receive the audible chirps transmitted from other user devices 110 can be analyzed to determine relative location of the each user device 110. Multiple user devices 110 may communicate with each other and share location information obtained from the received signal. Collecting and analyzing the relative location of each of the user devices 110 can reduce errors as compared to the location determined via analysis of location data obtained from a single user device 110. The orientation of the user device 110 can be obtained by utilizing a compass or accelerometer built in the user device 110 or by performing image processing as discussed earlier.

The motion sensor analysis module 520 identifies a physical location and orientation of the user device 110 or the content controller 120 without any external device. The motion sensor analysis module 520 detects a physical movement of the user device 110 using motion sensors such as an accelerometer (not shown) and/or a gyroscope (not shown). In addition, the motion sensor analysis module 520 infers an updated physical location and orientation of the user device 110 from a previously known physical location and orientation of the user device 110 based on the physical movement detected. To identify the updated physical location and orientation of the user device 110, the position detection module 210 obtains initial physical location and orientation of the user device 110 from the image processing module 510, GPS module 530, signal analysis module 540, or through other means.

In some embodiments, the position detection module 210 periodically updates the location of the user device 110 using the image processing module 510, GPS module 530, or signal analysis module 540. Although not necessary, updating the location of the user device 110 periodically helps calibrating the location measurements obtained from the position detection module 210.

Figure 6:
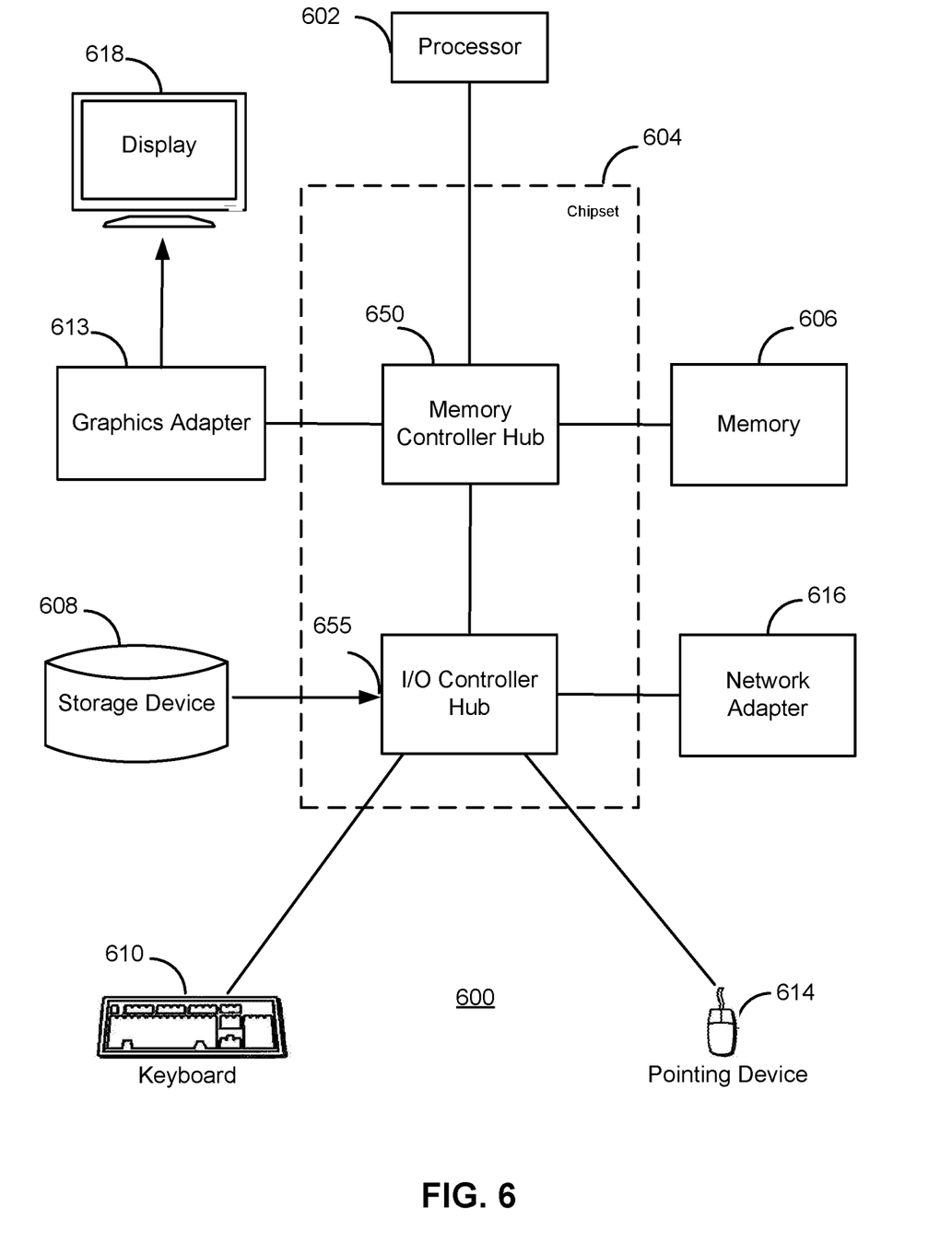
FIG. 6 is a block diagram illustrating an example of a computer suitable for use as a user device, content controller, or content server shown in FIG. 1, in accordance with an embodiment.

FIG. 6 is high level block diagram illustrating an example of a computer 600 for use as a user device 110, a content controller 120 or a content server 130, in accordance with an embodiment of the routing system. Illustrated are at least one processor 602 coupled to a chipset 604. The chipset 604 includes a memory controller hub 650 and an input/output (I/O) controller hub 655. A memory 606 and a graphics adapter 613 are coupled to the memory controller hub 650, and a display device 618 is coupled to the graphics adapter 613. A storage device 608, keyboard 610, pointing device 614, and network adapter 616 are coupled to the I/O controller hub 655. Other embodiments of the computer 600 have different architectures. For example, the memory 606 is directly coupled to the processor 602 in some embodiments.

The storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, or other type of pointing device, and in some embodiments is used in combination with the keyboard 610 to input data into the computer 600. The graphics adapter 613 displays images and other information on the display device 618. In some embodiments, the display device 618 includes a touch screen capability for receiving user input and selections and is connected to the I/O controller hub 655. The network adapter 616 couples the computer 600 to the network 101. Some embodiments of the computer 600 have different and/or other components than those shown in FIG. 6.

The computer 600 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 608, loaded into the memory 606, and executed by the processor 602.

The types of computers 600 used by the entities of FIG. 1 can vary depending upon the embodiment and the processing power used by the entity. For example, a user device 110 or a content controller 120 that is a PDA or a handheld mobile device typically has limited processing power, a small display device 618, and might lack a pointing device 614. The content server 130, in contrast, may comprise multiple blade servers working together to provide the functionality described herein. In one embodiment, the user device 110 is capable to act as a content controller 120 when needed. Alternatively, the content controller 120 is a personal computer and maybe combined with the content server 130.

Method of Sharing and Displaying a 3-D Virtual World

Figure 7:
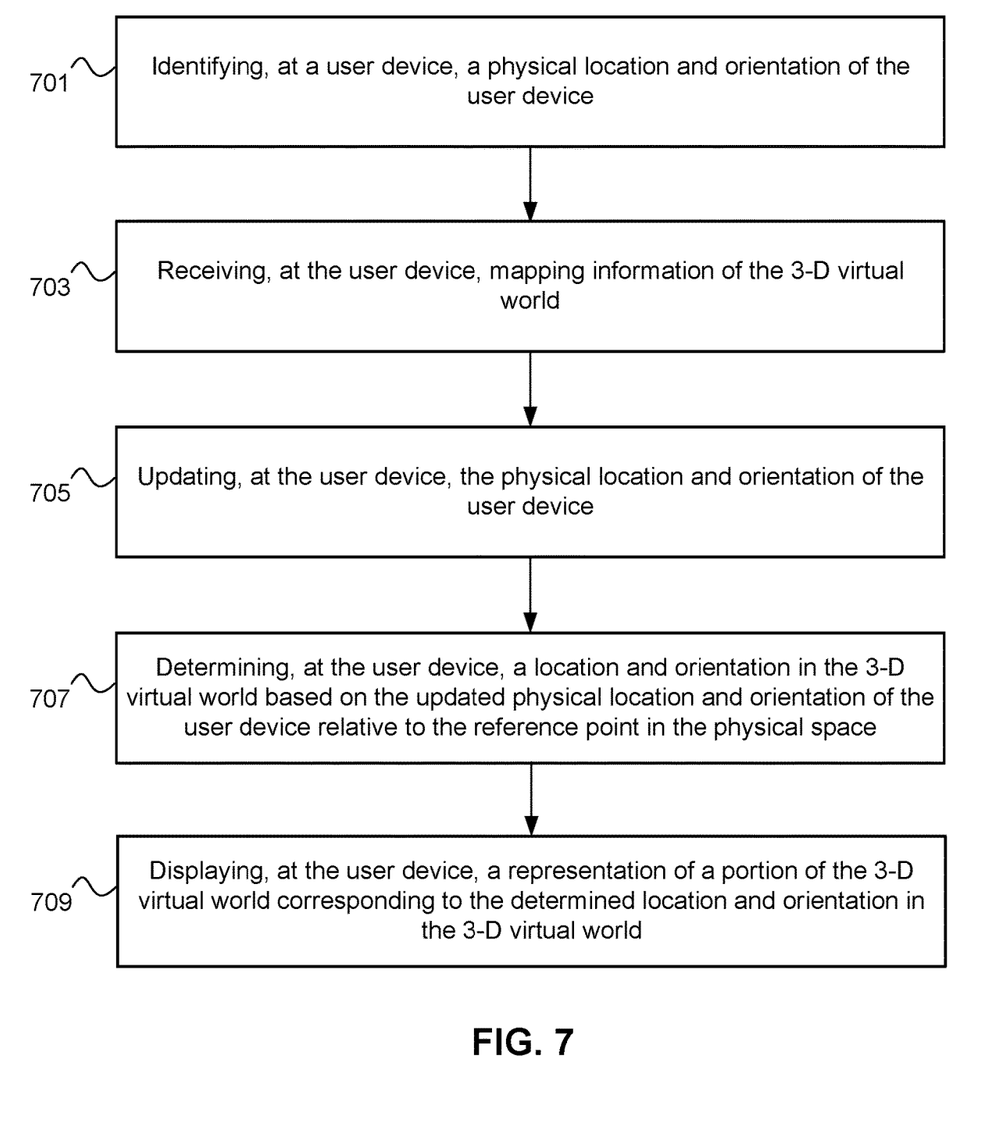
FIG. 7 is a flow chart illustrating a method of displaying a representation of a portion of a 3-D virtual world at a user device, in accordance with an embodiment.

FIG. 7 is a flow chart illustrating a method of displaying a representation of a portion of the 3-D virtual world. The steps of FIG. 7 are described from the perspective of a user device 110 performing the method. However, some or all of the steps may be performed by other entities and/or components. In addition, some embodiments may perform the steps in parallel, perform the steps in different orders, or perform different steps.

A user device 110-A identifies 701 a physical location and orientation of the user device 110. In addition, the user device 110-A receives 703 mapping information of the 3-D virtual world from a content controller 120. The mapping information of the 3-D virtual world comprises a mapping between a reference point in the physical space and a corresponding point in the 3-D virtual world. Additionally, the user device 110-A updates 705 a physical location and orientation of the user device 110-A. The updated physical location and orientation of the user device 110-A corresponds to a physical movement of the user device 110-A. Moreover, the user device 110-A, determines 707 a location and orientation in the 3-D virtual world based on the physical location and orientation of the user device 110-A relative to the reference point in the physical space. Furthermore, the user device 110-A displays the representation of the portion of the 3-D virtual world corresponding to the determined location and orientation in the 3-D virtual world.

In one embodiment, the user device 110-A receives mapping information (B) from another user device 110-B (or the content controller 120), under permission of the content controller 120, if required. The mapping information (B) comprises mapping between a reference point (B) in the physical space and a corresponding point (B) in the 3-D virtual world (B). If the user device 110-A does not have a map of a 3-D virtual world (B) of said another user device 110-B stored on a user device database 250-A, the user device 110-A may receive the map of the 3-D virtual world (B) of said another user device 110-B from said another user device 110-B, the content controller 120, or the content server 130. The user device 110-A detects a physical location and movement of the user device 110-A and determines, at the user device 110-A, a location and orientation of the user device 110-A in the 3-D virtual world (B) based on the physical location and orientation of the user device 110-A relative to the reference point (B). The user device 110-A displays a representation of a portion of the 3-D virtual world (B) corresponding to the determined location and orientation of the user device 110-A in the 3-D virtual world (B). Hence, the user device 110-A can switch to or enter the 3-D virtual world (B) of said another user device 110-B. The exact or similar process can be applied to the content controller 120 in place of said another user device 110-B.

In one embodiment, another user device 110-B (or the content controller 120) displays a representation (i.e., an image) of a portion of a 3-D virtual world (A) identical to one displayed on the user device 110-A, under permission or control of the content controller 120 if necessary. Instead of streaming the image displayed on the user device 110-A, a user device network module 230-B at said another user device 110-B receives a map, mapping information, and an updated physical location and orientation of the user device 110-A. A user device 3-D processor 240-B at said another user device 110-B determines a location and orientation of the user device 110-A in the 3-D virtual world (A) based on the received updated physical location and orientation of the user device 110-A relative to the mapping information received. The user device 110-B displays the representation of the portion of the 3-D virtual world (A) corresponding to the determined location and orientation of the user device 110-A in the 3-D virtual world (A). Hence, said another user device 110-B displays an image identical to one displayed on the user device 110-A, without streaming any image data. A similar process can be applied to the content controller 120 in place of said another user device 110-B. The disclosed method enables saving of bandwidth of information communicated, since only the physical location and orientation of said another user device 110-B need to be constantly updated instead of streaming images from the user device 110-B.

Figure 8:
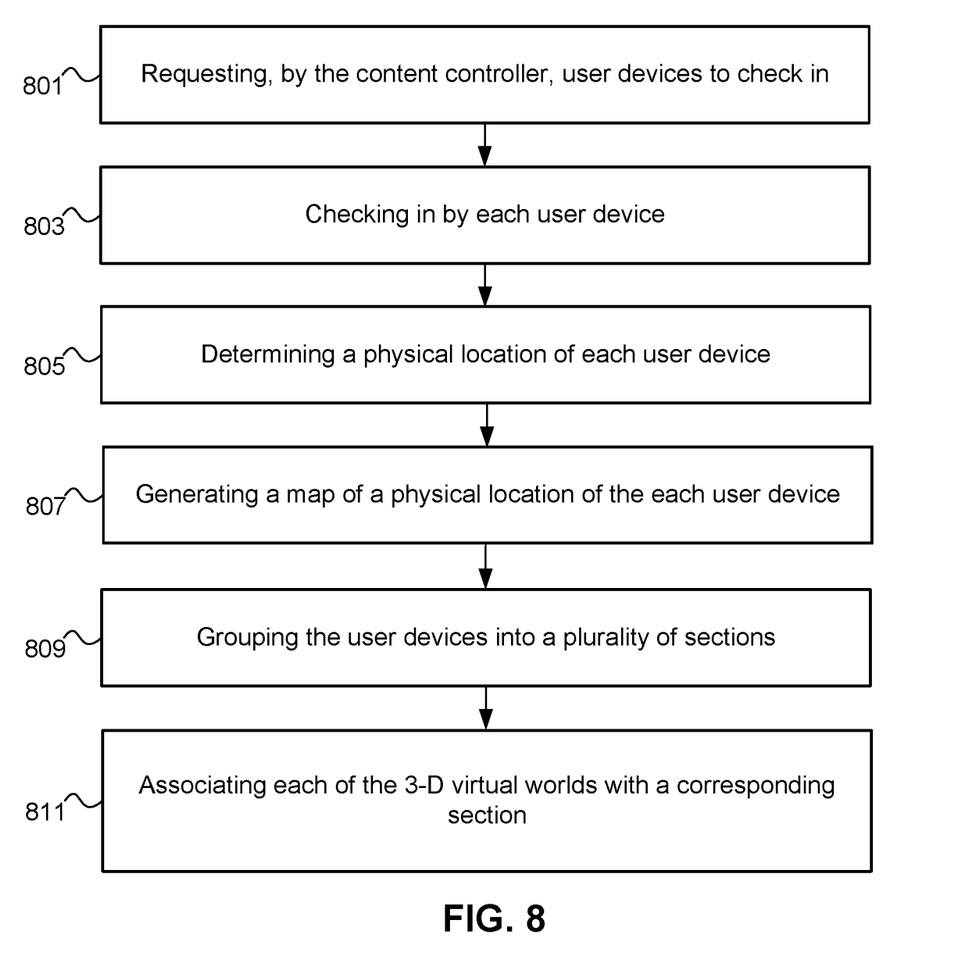
FIG. 8 is a flow chart illustrating a method of grouping a plurality of user devices into a plurality of sections, in accordance with an embodiment.

FIG. 8 is a flow chart illustrating a method of grouping a plurality of user devices 110A-N into a plurality of sections. The method allows the content controller 120 to spatially allocate a 3-D Virtual world, monitor activities and/or assign operations to be performed for each section. The steps of FIG. 8 are described from the perspective of the content controller 120 performing the method. However, some or all of the steps may be performed by other entities and/or components. In addition, some embodiments may perform the steps in parallel, perform the steps in different orders, or perform different steps.

In the disclosed method, the content controller 120 requests 801, through the content controller interface module 320, the plurality of user devices 110A-N to check in. Each of the plurality of user devices 110A-N checks in 803 using the user interface module 220. The content controller 120 determines 805 a physical location of the each of the plurality of user devices 110A-N. In one embodiment, a physical location of the each of the plurality of user devices 110A-N is determined through the disclosed system and method discussed above. The content controller 120 or the each of the plurality of user devices 110A-N generates 807 a map of the physical location of the each of the user devices 110A-N. In addition, the content controller 120 groups 809 the plurality of user devices 110A-N into a plurality of sections. Additionally, the content controller 120 associates 811 each of the plurality of 3-D virtual worlds with a corresponding section, where the corresponding section is from the plurality of sections.

In various embodiments, the user devices 110A-N are grouped based on the captured physical location of each user device 110 at a given time. The captured physical locations can be used to generate a dynamic grouping chart (e.g., map). The dynamic grouping chart is a spatially organized view of current and/or previous activities of each user device 110. In one such embodiment, the plurality of user devices 110A-N are automatically grouped into the plurality of sections, based on the physical location of the each user device 110 at the given time. For example, the user devices 110 may be split into groups corresponding to the individual tables at which students are sat. In another such embodiment, the dynamic grouping chart is presented to an instructor who can manually split the user devices 110 into groups. For example, the instructor may select a subset of the user devices 110 by clicking on a representation of the devices or drawing a lasso around them on the dynamic grouping chart.

Once the user devices 110 are divided into groups, one or more groups can be assigned to each section. Thus, each group can experience a different virtual world, or a different aspect of a common virtual world. Alternatively or additionally, the content controller 120 can define and modify the plurality of sections through the content controller interface module 320. In one embodiment, the content controller 120 assigns a 3-D virtual map, applications, tasks, and/or documents to each section.

Figure 9:
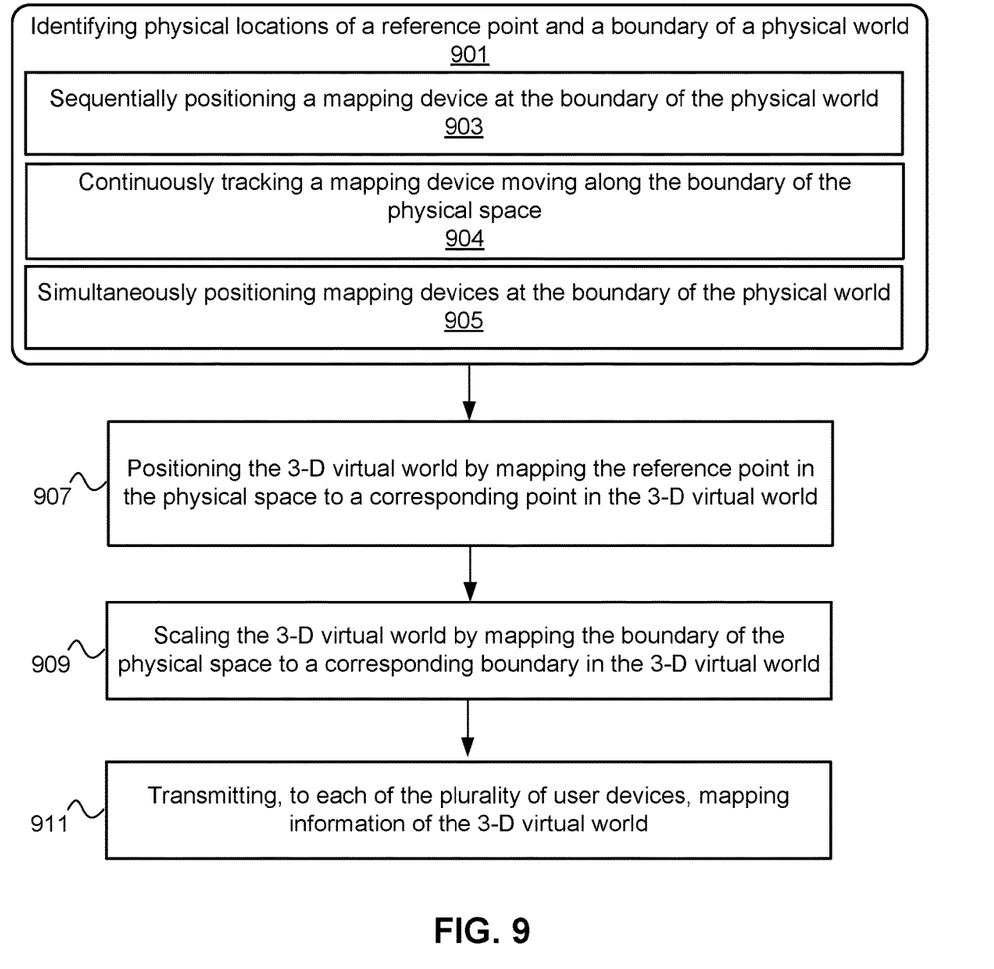
FIG. 9 is a flow chart illustrating a method of auto-scaling a 3-D virtual world, in accordance with an embodiment.

FIG. 9 is a flow chart illustrating a method of auto-scaling a 3-D virtual world. The steps of FIG. 9 are described from the perspective of the content controller 120 performing the method. However, some or all of the steps may be performed by other entities and/or components. In addition, some embodiments may perform the steps in parallel, perform the steps in different orders, or perform different steps.

The content controller 120 identifies 901 physical locations of a reference point and boundary of a physical space. To identify 901 the physical locations of the reference point and boundary in the physical space, the content controller 120 can instruct an operator of a mapping device to position 903 the mapping device at the boundary in the physical space. Each of the mapping devices identifies and updates its own physical location. The mapping devices can be a subset of the plurality of user devices 110A-N, a content controller 120, or a combination of the subset of user devices 110A-N and the content controller 120. Alternatively, the mapping devices can be dedicated devices for mapping that provide precise location information.

A mapping device may be sequentially positioned 903 discretely at the boundary of the physical world. Alternatively or additionally, the movement of the mapping device moving along the boundary of the physical world is continuously tracked 904 to define the boundary in the physical space. Alternatively or additionally, the content controller 120 can instruct operators of the mapping devices to simultaneously position 905 the mapping devices at the boundary in the physical space.

The content controller 120 positions 907 the 3-D virtual world by mapping the reference point in the physical space to a corresponding point in the 3-D virtual world. Furthermore, the content controller 120 scales 909 the 3-D virtual world by mapping the boundary in the physical space to a corresponding boundary in the 3-D virtual world. The content controller interface module 320 or other additional module in the content controller 120 may stretch or adjust the 3-D virtual world appropriately to match the corresponding boundary in the 3-D virtual world with the boundary in the physical space. Furthermore, the content controller 120 transmits 911, to each of the plurality of user devices 110A-N, the mapping information of the 3-D virtual world. The mapping information of the 3-D virtual world comprises the mapping of the physical reference point to the corresponding point in the virtual world and the mapping of the physical boundary to the corresponding boundary in the virtual world.

For example, if the disclosed system 100 is used in a certain physical space (e.g., a classroom) for the first time, the content controller 120 may perform the auto-scaling method mentioned above to learn the shape of the room. Additionally, the content controller 120 may scale a 3-D virtual world to overlay onto a desired physical space within the room using the auto-scaling method disclosed above. Instead of auto-scaling, the content controller 120 may manually adjust the corresponding point and corresponding boundary of the 3-D virtual world through the content controller interface module 320 to ensure the corresponding boundaries of the 3-D virtual world fit within the desired physical space. Once the shape of the room or the desired physical space is gauged, the content controller 120 may store mapping information in the content controller database 350 or the content server database 430 for reuse in the future. In addition, the gauged shape of the room or the desired physical space may be applied for mapping any 3-D virtual world.

Example Usage of 3-D Virtual World Sharing System

Figure 10:
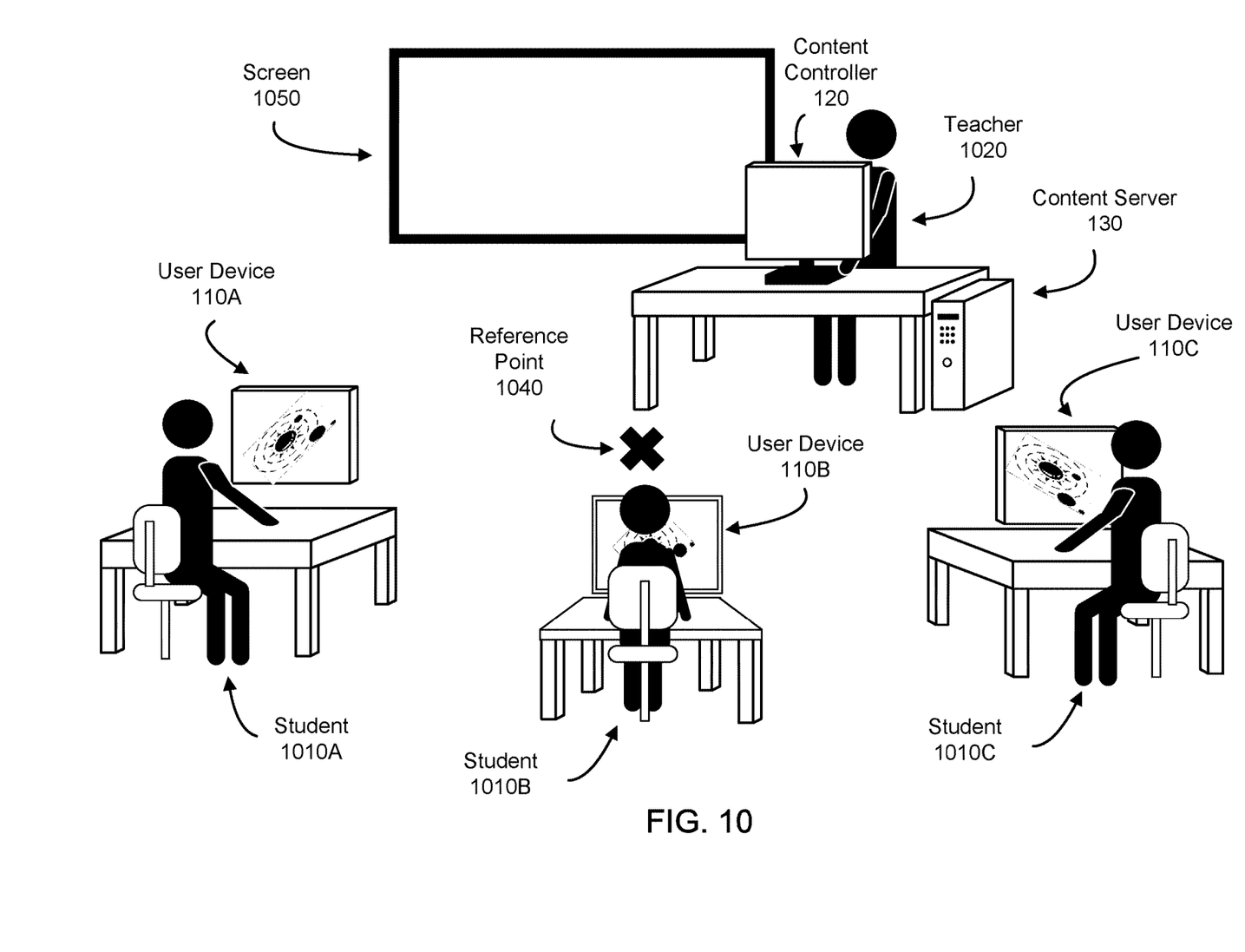
FIG. 10 is an example usage of the 3-D virtual reality sharing system in a classroom setting, in accordance with an embodiment.

FIG. 10 is an example usage of the immersive 3-D virtual reality sharing system 100 in a classroom setting, in accordance with an embodiment of the invention. In the example, a teacher 1020 (or an instructor) operates a content controller 120 and students 1010A-C (or trainees) operate user devices 110A-C. With the disclosed system 100 and method, each student 1010 views a representation of a portion of a solar system through the user device 110. The content controller 120 determines a physical location of a reference point 1040 in the classroom. A corresponding point in the 3-D virtual world is overlaid onto the physical location of the reference point 1040. The content controller 120 may change the physical location of the reference point 1040 to any place within or beyond the classroom (physical space). Depending on a physical location and orientation of the user device 110 relative to the reference point 1040, each user device 110 displays its own unique 3-D virtual image. Therefore, an image displayed on the user device 110A is different from those on the user device 110B and 110C. As a student 1010 physically moves the user device 110, the 3-D virtual image displayed on the user device 110 is updated as if the student 1010 was moving around inside the 3-D virtual world. Hence, the user device 110 functions as a window into the 3-D virtual world providing an immersive 3-D virtual reality experience.

While a student 1010 moves around in the 3-D virtual world or a portion of the 3-D virtual world moves, a student may encounter an object such as Saturn in the solar system, and related information such as indexes, descriptions, messages, interactive content relating to Saturn may be presented to the student 1010. The interactive contents can include a quiz, game, and/or trigger to enter another 3-D virtual world. The teacher 1020 may limit access for each student 1010 to the related information (e.g., a student may only be able to visit the surface of Saturn after successfully completing a quiz related Saturn). If the teacher 1020 allows, the student may download maps of the 3-D virtual world on the user device 110. Moreover, the teacher 1020 may allow or limit communication between each student for group discussions. In addition, the teacher 1020 may project an image of the content controller 120 or any of the user devices 110A-C on the screen 1050. Furthermore, the teacher 1020 may control the user devices 110A-C to display an image of any of the user devices 110A-C or the content controller 120 in accordance with the disclosed system 100 or method.

To properly overlay a 3-D virtual world onto a classroom (physical space), the teacher 1020 utilizes the content controller 120 to scale the 3-D virtual world in accordance with the disclosed system 100 or method. For example, the 3-D virtual world can be, but is not limited to, a solar system, frog pond, Constitutional Hall in Philadelphia, or molecular structure. Once mapping information of the 3-D virtual world is obtained, mapping information of other 3-D virtual worlds may be automatically calculated. For example, if a student 1010 encounters Saturn in a 3-D virtual world representing a solar system and is triggered to land on Saturn, mapping information of another 3-D virtual world representing a surface of Saturn may be deduced from the mapping information of the 3-D virtual world representing the solar system. The teacher 1020 may switch from an old 3-D virtual world (e.g., solar system) to a new 3-D virtual world (e.g., molecular structure), and the teacher 1020 may utilize mapping information of the old 3-D virtual world to automatically obtain mapping information of the new 3-D virtual world. Alternatively and/or additionally, the teacher 1020 may manually determine or adjust the mapping information of the new 3-D virtual world.

Figure 11:
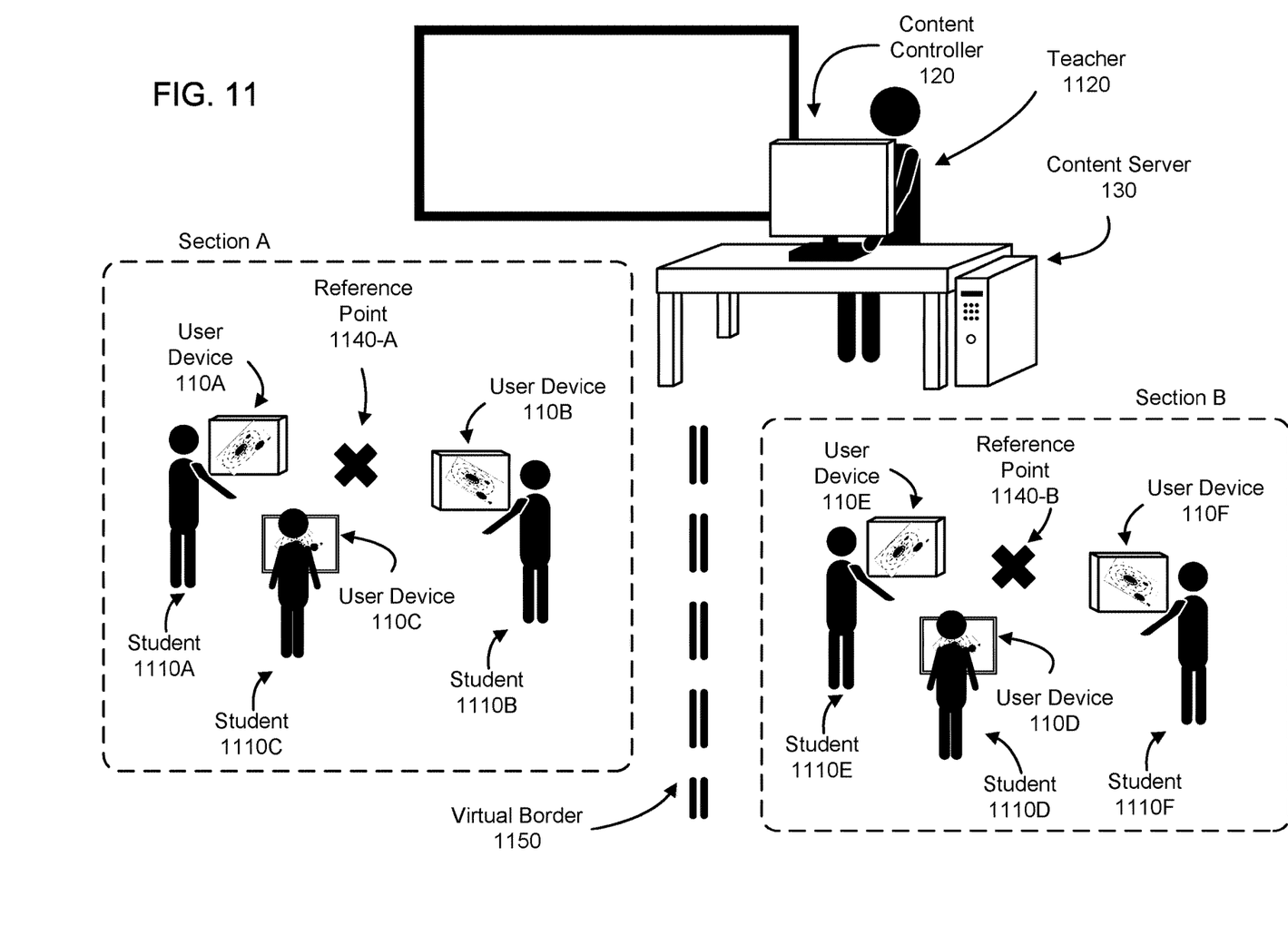
FIG. 11 is an example usage of the 3-D virtual reality sharing system in a classroom setting with a plurality sections, in accordance with an embodiment.

FIG. 11 is an example usage of the immersive 3-D virtual reality sharing system 100 in the classroom setting with a plurality of sections, in accordance with an embodiment of the invention. The teacher 1120 groups students 1110A-F into two sections A-B. In the example, three students 1110A-C are grouped in section A, and another three students 1110D-F are grouped in section B. The teacher 1120 associates a physical location of a reference point 1140-A of a 3-D virtual world (A) with section A and a physical location of a reference point 1140-B of a 3-D virtual world (B) with section B. Each of the user devices 110A-F displays a unique representation of a portion of a 3-D virtual world relative to a physical location and orientation of each of the user devices 110A-F from an associated reference point 1140. The 3-D virtual world (A) and 3-D virtual world (B) may be the same virtual world but not necessarily. For example, the students 1110A-F in sections A-B may view an image of 3-D virtual model of Saturn, but images displayed for the students 1110A-C are respect to the reference point 1140-A and images displayed for the students 1110A-C are respect to the reference point 1140-B. Or for example, the students 1110A-C grouped in section A may view an image of a 3-D virtual model of Saturn, while the students 1110D-F grouped in section B may view an image of a 3-D virtual model of Mars.

The teacher 1120 may establish a virtual border 1150 such that if a student 1110 crosses the virtual border 1150, the user device 110 may change its section and switch or enter another 3-D virtual world. Alternatively, the teacher 1120 and/or the student 1110 maybe notified and given an option to switch the section, if the student 1110 crosses the virtual border 1150.

For each section, the teacher 1120 can spatially organize and launch an application on the user devices 110. For example, the teacher 1120 may assign a group project or quiz for each section. Additionally, the teacher 1120 may monitor activities and performances of students 1110 for each section.

Beneficially, the disclosed system 100 and method described above provides immersive 3-D virtual reality experience to users. Despite the examples illustrated in FIGS. 10-11 are in a classroom setting, the system 100 and method can be used in other virtual learning or sharing environment (e.g., gaming, entertainment, training, conference meeting, advertisement, etc.) In one embodiment, the virtual world may have more than three dimensions. For example, each user device 110 renders a representation of a portion of 3-D virtual world corresponding to time, in addition to a location and orientation in the 3-D virtual world.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise. Upon reading this disclosure, those of skill in the art will appreciate still additional alternative structural and functional designs for a system and a method for sharing an immersive virtual reality through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   determining, by a content controller, a physical location of each of a plurality of user devices, the content controller being controlled by a user that is physically proximate to users of the plurality of user devices;
   grouping the plurality of user devices into a first section and a second section based on the physical location of each of the plurality of user devices;
   associating a first 3-D virtual environment with the user devices of the first section;
   transmitting mapping information that maps the first 3-D virtual environment to a first portion of a physical space to the user devices of the first section;
   associating a second 3-D virtual environment with the user devices of the second section; and
   triggering display, on a user interface of the content controller, of a dynamic grouping chart that allows the user of the content controller to group the plurality of user devices into sections.

2. The method of claim 1, further comprising:
   monitoring an updated physical location of a user device of the first section;
   grouping the user device with the second section based on the updated physical location; and
   transmitting mapping information of the second 3-D virtual environment to the user device.

3. The method of claim 1, wherein the dynamic grouping chart is generated based on the determined physical locations of the plurality of user devices.

4. The method of claim 3, wherein the dynamic grouping chart includes a spatially organized view of current activities of the plurality of user devices.

5. The method of claim 3, wherein the dynamic grouping chart includes a spatially organized view of previous activities of the plurality of user devices.

6. The method of claim 3, wherein the grouping the plurality of user devices includes:
   receiving user input relating to grouping the user devices while the dynamic grouping chart is being displayed; and
   grouping the plurality of user devices based on the received user input.

7. The method of claim 1, further comprising:
   assigning a first activity to user devices of the first section; and
   assigning a second activity to user devices of the second section.

8. The method of claim 1, further comprising:
   scaling the first 3-D virtual environment to fit the first portion of the physical space; and scaling the second 3-D virtual environment to fit a second portion of the physical space.

9. The method of claim 8, wherein the mapping information of the first 3-D virtual environment includes a mapping between a reference point in the first portion of the physical space and a corresponding point in the first 3-D virtual environment and mapping information of the second 3-D virtual environment includes a mapping between a reference point in the second portion of the physical space and a corresponding point in the second 3-D virtual environment.

10. The method of claim 1, wherein the determining physical locations of the plurality of user devices includes:
   transmitting a request for a user device of the plurality of user devices to check-in; and
   receiving a physical location from the user device.

11. A system, comprising:
   a content controller configured to:
      determine physical locations of a plurality of user devices that are physically proximate to the content controller;
      trigger display, on a user interface of the content controller, of a dynamic grouping chart that allows a user of the content controller to group the plurality of user devices into groups;
      receive user input relating to grouping the user devices while the dynamic grouping chart is being displayed;
      group the plurality of user devices into a first section and a second section based on the user input;
      transmit first 3-D virtual environment mapping information to the user devices of the first section;
      transmit second 3-D virtual environment mapping information to the user devices of the second section;
      assign a first activity to user devices of the first section; and
      assign a second activity to user devices of the second section.

12. The system of claim 11, wherein the first 3-D virtual environment mapping information is associated with a first virtual world and the second 3-D virtual environment mapping information is associated with a second 3-D virtual world.

13. The system of claim 11, wherein the first 3-D virtual environment mapping information includes a mapping between a reference point in a first portion of a physical space and a first corresponding point in a 3-D virtual world and the second 3-D virtual environment mapping information includes a mapping between a reference point in a second portion of the physical space and a second corresponding point in the 3-D virtual world.

14. The system of claim 11, wherein the first activity includes an interactive task to be performed in virtual reality.

15. The system of claim 11, wherein the first activity includes a group project for the user devices of the first section to complete in virtual reality.

16. The system of claim 11, further comprising a user device that includes:
   a position detection module configured to identify a physical location of the user device within a physical space;
   a user device network module configured to receive virtual environment mapping information from the content controller and to transmit the physical location to the content controller; and
   a user device 3-D processor module configured to:
      determine a location and orientation in a virtual environment based on the received virtual environment mapping information;
      generate a representation of the virtual environment based on the determined location and orientation in the virtual environment; and
      display the representation of the virtual environment.

17. A method comprising:
   determining, by a content controller, a physical location at a specific time of each of a plurality of user devices that are physically proximate to the content controller;
   grouping the plurality of user devices into a first section and a second section based on the physical location of each of the plurality of user devices at the specific time;
   associating the first section with a first virtual environment;
   transmitting first mapping information to the user devices of the first section, the first mapping information including a mapping between a physical location in a first portion of a physical space and the first virtual environment;
   assigning to user devices of the first section a first activity to be performed in the first virtual environment;
   associating the second section with a second virtual environment;
   assigning to user devices of the second section a second activity to be performed in the second virtual environment; and
   triggering display, on a user interface of the content controller, of a dynamic grouping chart that allows a user of the content controller to group the plurality of user devices into sections.

18. The method of claim 17, wherein the first activity includes a first group project for the user devices of the first section to complete in the virtual environment.

19. The method of claim 17, wherein the assigning to user devices of the first section the first activity includes:
   providing interactive content to the user devices of the first section; and
   receiving responses to the interactive content from the user devices of the first section.

* * * * *

UNITED STATES PATENT AND TRADEMARK OFFICE
CERTIFICATE OF CORRECTION

PATENT NO. : 10,535,116 B2
APPLICATION NO. : 15/823456
DATED : January 14, 2020
INVENTOR(S) : Monk et al.

Page 1 of 1

It is certified that error appears in the above-identified patent and that said Letters Patent is hereby corrected as shown below:

In the Claims

In Column 17, Claim 12, Line 38, delete "first" and insert -- first 3-D --, therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*